United States Patent
Faronius et al.

(10) Patent No.: US 10,674,504 B2
(45) Date of Patent: Jun. 2, 2020

(54) SCHEDULING OF SUBFRAMES AT PROTOCOL LAYER L1

(71) Applicant: TELEFONAKTIEBOLAGET LM ERICSSON (PUBL), Stockholm (SE)

(72) Inventors: Carola Faronius, Järfälla (SE); Franz Heiser, Järfälla (SE); Ying Sun, Sundbyberg (SE); Yu Yang, Solna (SE); Henrik Olson, Spånga (SE); Hyuckchan Kwon, Seoul (KR); Shashi Kant, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 15/781,546

(22) PCT Filed: Dec. 18, 2015

(86) PCT No.: PCT/SE2015/051368
§ 371 (c)(1),
(2) Date: Jun. 5, 2018

(87) PCT Pub. No.: WO2017/105306
PCT Pub. Date: Jun. 22, 2017

(65) Prior Publication Data
US 2019/0045503 A1    Feb. 7, 2019

(51) Int. Cl.
*H04W 72/04* (2009.01)
*H04W 72/12* (2009.01)

(52) U.S. Cl.
CPC ... *H04W 72/0446* (2013.01); *H04W 72/1215* (2013.01); *H04W 72/1263* (2013.01)

(58) Field of Classification Search
CPC ........ H04W 72/0446; H04W 72/1215; H04W 72/1263; H04W 72/1284; H04W 72/1242; H04W 72/1289; H04W 24/10; H04W 84/042

See application file for complete search history.

(56) References Cited

U.S. PATENT DOCUMENTS

| | | | |
|---|---|---|---|
| 7,484,000 B2 * | 1/2009 | Jiang | H04L 1/1841 370/229 |
| 9,326,157 B1 * | 4/2016 | Bhorkar | H04W 16/14 |
| 2001/0021984 A1 | 9/2001 | Kim | |
| 2007/0081498 A1 * | 4/2007 | Niwano | H04W 72/10 370/335 |
| 2014/0079031 A1 * | 3/2014 | Parkvall | H04L 5/0058 370/336 |

(Continued)

OTHER PUBLICATIONS

GPP TR 25.855 V2.0.0, Sep. 2001, Technical Specification Group Radio Access Network; High-speed Downlink Packet Access.*

(Continued)

*Primary Examiner* — Afsar M Qureshi
(74) *Attorney, Agent, or Firm* — Sage Patent Group (57) ABSTRACT

There is provided mechanisms for scheduling subframes at protocol layer L1. The method is performed by a network device. A method comprises obtaining, at the protocol layer L1, an indication of an occurrence of Listen Before Talk (LBT) failure for transmission of a subframe in an unlicensed frequency spectrum. The method comprises storing, in an L1 buffer, data of the subframe to be transmitted in the unlicensed frequency spectrum as a result thereof.

16 Claims, 8 Drawing Sheets

(56) References Cited

U.S. PATENT DOCUMENTS

| | | | | |
|---|---|---|---|---|
| 2014/0177560 A1* | 6/2014 | Guo | ............... | H04W 52/365 |
| | | | | 370/329 |
| 2015/0334744 A1* | 11/2015 | Ji | ................ | H04W 74/0816 |
| | | | | 370/336 |
| 2016/0142934 A1* | 5/2016 | Ahmadzadeh | .... | H04W 28/0278 |
| | | | | 370/328 |
| 2018/0049241 A1* | 2/2018 | Heo | ............ | H04W 74/0808 |
| 2018/0317246 A1* | 11/2018 | Mukherjee | ........ | H04W 74/0816 |
| 2018/0367282 A1* | 12/2018 | Li | .................... | H04L 1/1896 |

OTHER PUBLICATIONS 3.sup.rd Generation Partnership Project; Technical Specification Group Radio Access Network; High Speed Downlink Packet Access (HSDPA) Overall Description (Release 5) TS 25.308 v5.10.*

3GPP TR 36.889 V13.0.0, "3rd Generation Partnership Project; Technical Specification Group Radio Access Network; Study on Licensed-Assisted Access to Unlicensed Spectrum; (Release 13)", Jun. 2015, (Only Chapter 7, pp. 37-51, are of relevance).

3GPP TSG RAN WG 1 #82bis, R1-156371, "WF on signaling in LAA DL subframes", Oct. 5-9, 2015, Malmo, Sweden.

International Search Report and Written Opinion, dated Aug. 26, 2016, from corresponding PCT Application No. PCT/SE2015/051368.

* cited by examiner

SCHEDULING OF SUBFRAMES AT PROTOCOL LAYER L1

TECHNICAL FIELD

Embodiments presented herein relate to a method, a network device, a computer program, and a computer program product for scheduling subframes at protocol layer L1.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is spectrum availability.

The spectrum allocated to some telecommunications standards, such as Long Term evolution (LTE), is limited and may therefore have difficulties to meet future throughput demands. It has therefore been proposed to allow at least some telecommunications standards to operate also in unlicensed frequency spectrum in addition to licensed spectrum. One way to utilize the unlicensed frequency spectrum reliably is to transmit essential control signals and channels on a frequency carrier in the licensed spectrum whereas other control signals, channels, and data is transmitted in the unlicensed frequency spectrum.

The 3rd Generation Partnership Project (3GPP) Release 13 (Rel-13) work item "Licensed-Assisted Access" (LAA) intends to allow devices to also operate in the, today, unlicensed 5 GHz spectrum. The unlicensed 5 GHz spectrum is intended to be used as a complement to the licensed spectrum. Accordingly, devices that connect in the licensed spectrum (with a primary cell, denoted PCell) can use mechanisms such as carrier aggregation to benefit from additional transmission capacity in the unlicensed frequency spectrum (from a secondary cell, denoted SCell). To reduce the changes required for aggregating licensed and unlicensed frequency spectrum, the LTE frame timing in the primary cell is simultaneously used in the secondary cell.

Unlicensed frequency spectrum can, by definition, be simultaneously used by multiple different technologies. Therefore, considerations are made regarding coexistence with other systems such as the IEEE 802.11 Wireless Local Area Network (WLAN) standard (known as Wi-Fi). Performing operations of a telecommunications standard in the same manner in unlicensed frequency spectrum as in licensed spectrum could degrade the performance of other systems operating in the unlicensed frequency spectrum since some of these systems are configured such that no transmissions are made once an occupied channel has been detected.

Regulatory requirements may therefore not permit transmissions in the unlicensed frequency spectrum without prior channel sensing. Since the unlicensed frequency spectrum could be shared with other systems intended for similar or dissimilar wireless technologies, it has therefore been proposed to use a so called listen-before-talk (LBT) mechanism. In general terms, LBT involves the device (which intends to use a channel in the unlicensed frequency spectrum for transmission) senses the medium for a pre-defined minimum amount of time and backs off if the channel is busy.

As a non-limiting example, European Regulation EN 301.893, v. 1.7.1 provides the following requirements and minimum behavior for a load-based clear channel assessment (CCA). Such a CCA can be used as part of an LBT mechanism.

Step 1) Before a transmission or a burst of transmissions on an Operating Channel, the device shall perform a Clear Channel Assessment (CCA) check using "energy detect". The device shall observe the Operating Channel(s) for the duration of the CCA observation time which shall be not less than 20 µs. The CCA observation time used by the device shall be declared by the manufacturer. The Operating Channel shall be considered occupied if the energy level in the channel exceeds the threshold corresponding to the power level given in Step 5 below. If the device finds the channel to be clear, it may transmit immediately (see Step 3 below).

Step 2) If the device finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer. The counter is decremented every time a CCA slot is considered to be "unoccupied". When the counter reaches zero, the device may transmit.

Step 3) The total time that a device makes use of an Operating Channel is the Maximum Channel Occupancy Time which shall be less than $(13/32) \times q$ ms, with q as defined in Step 2 above, after which the device shall perform the Extended CCA described in Step 2 above.

Step 4) The device, upon correct reception of a packet which was intended for this device, can skip CCA and immediately proceed with the transmission of management and control frames (e.g. acknowledgement (ACK) and Block ACK frames). A consecutive sequence of transmissions by the device, without it performing a new CCA, shall not exceed the Maximum Channel Occupancy Time as defined in step 3 above. For the purpose of multi-cast, the ACK transmissions (associated with the same data packet) of the individual devices are allowed to take place in a sequence.

Step 5) The energy detection threshold for the CCA shall be proportional to the maximum transmit power (PH) of the transmitter: for a 23 dBm equivalent isotropically radiated power (EIRP) transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm EIRP).

Despite the above presented procedure, there is still a problem of how to handle data transmissions during LBT failure.

SUMMARY

An object of embodiments herein is to provide efficient handling of scheduled data when the LBT fails.

According to a first aspect there is presented a method for scheduling subframes at protocol layer L1. The method is performed by a network device. The method comprises obtaining, at the protocol layer L1, an indication of an occurrence of Listen Before Talk (LBT) failure for transmission of a subframe in an unlicensed frequency spectrum. The method comprises storing, in an L1 buffer, data of the subframe to be transmitted in the unlicensed frequency spectrum as a result thereof.

Advantageously this provides efficient handling of scheduled data when the LBT fails. In turn, this efficient handling of scheduled data when the LBT fails provides a solution to the problem of how to handle data transmissions during LBT failure.

Still advantageously this enables quality of service (QoS) considerations to be supported in scenarios where LBT mechanisms are used.

Still advantageously this enables shorter latency compared to legacy scheme where rescheduling at higher protocol layers is performed, which in turn leads to scheduling delays. The herein disclosed embodiments remove, or at least reduce, these scheduling delays.

Still advantageously this enables efficient processing resource utilization both for protocol layer L1 operations as well as for higher protocol layers, such as protocol layer L2 and/or L3.

According to a second aspect there is presented a network device for scheduling subframes at protocol layer L1. The network device comprises processing circuitry. The processing circuitry is configured to cause the network device to obtain, at the protocol layer L1, an indication of an occurrence of LBT failure for transmission of a subframe in an unlicensed frequency spectrum. The processing circuitry is configured to cause the network device to store, in an L1 buffer, data of the subframe to be transmitted in the unlicensed frequency spectrum as a result thereof.

According to a third aspect there is presented a network device for scheduling subframes at protocol layer L1. The network device comprises processing circuitry. The network device comprises a computer program product storing instructions that, when executed by the processing circuitry, causes the network device to perform operations, or steps. The operations, or steps, cause the network device to obtain, at the protocol layer L1, an indication of an occurrence of LBT failure for transmission of a subframe in an unlicensed frequency spectrum. The operations, or steps, cause the network device to store, in an L1 buffer, data of the subframe to be transmitted in the unlicensed frequency spectrum as a result thereof.

According to a fourth aspect there is presented a network device for scheduling subframes at protocol layer L1. The network device comprises a first obtain module configured to obtain, at the protocol layer L1, an indication of an occurrence of LBT failure for transmission of a subframe in an unlicensed frequency spectrum. The network device comprises a store module configured to store, in an L1 buffer, data of the subframe to be transmitted in the unlicensed frequency spectrum as a result thereof.

According to a fifth aspect there is presented a radio access network node comprising a network device according to any one of the second, third, or fourth aspects.

According to a sixth aspect there is presented a wireless device comprising a network device according to any one of the second, third, or fourth aspects.

According to a seventh aspect there is presented a computer program for scheduling subframes at protocol layer L1, the computer program comprising computer program code which, when run on a network device, causes the network device to perform a method according to the first aspect.

According to an eight aspect there is presented a computer program product comprising a computer program according to the seventh aspect and a computer readable storage medium on which the computer program is stored.

It is to be noted that any feature of the first, second, third, fourth, fifth, sixth seventh and eight aspects may be applied to any other aspect, wherever appropriate. Likewise, any advantage of the first aspect may equally apply to the second, third, fourth, fifth, sixth, seventh, and/or eight aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
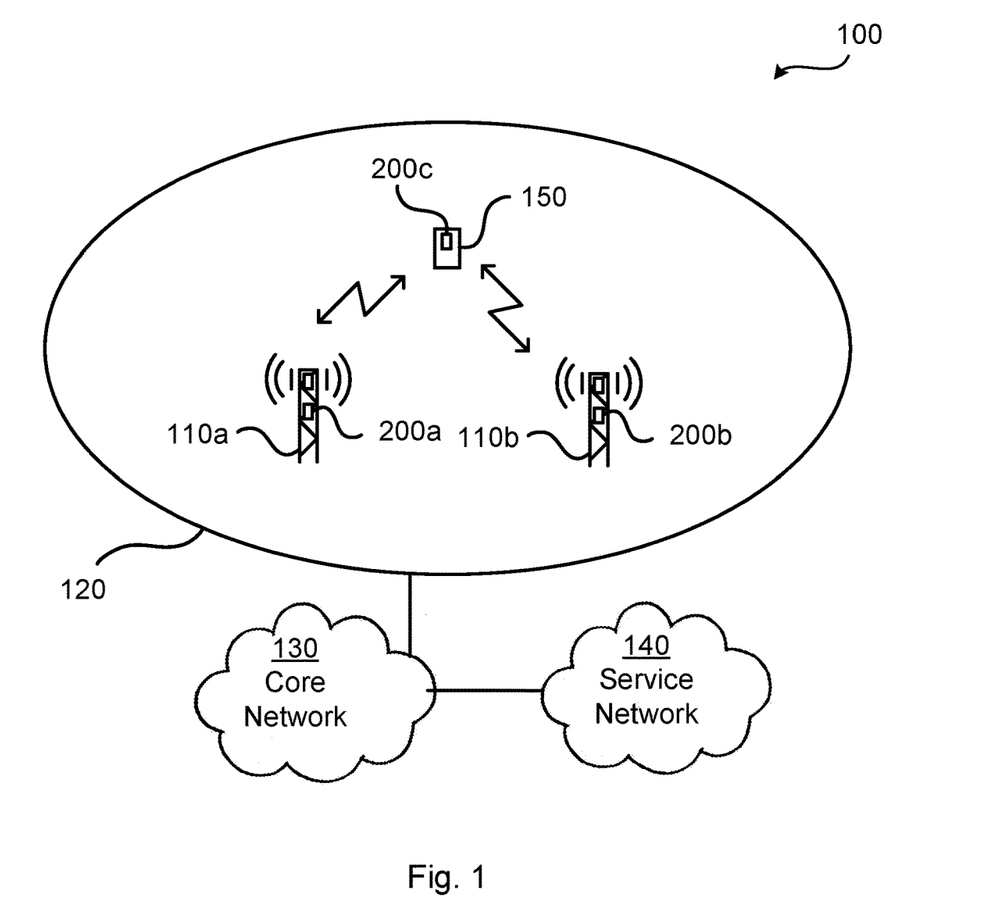
FIG. 1 is a schematic diagram illustrating a communication network according to embodiments.

FIG. 1 is a schematic diagram illustrating a communications network 100 where embodiments presented herein can be applied. The communications system 100 comprises a radio access network 120, a core network 130, and a service network 140.

The radio access network 120 comprises at least one radio access network node 110*a*, 110*b*. The radio access network 120 is operatively connected to the core network 130 which in turn is operatively connected to the service network 140. The radio access network node 110*a*, 110*b* thereby enables the wireless device 150 to access services and exchange data as provided by the service network 140.

In case there are two or more radio access network nodes 110a, 110b one of the radio access network nodes may provide a primary cell (PCell) whereas one or more of the remaining radio access network nodes may provide a secondary cell (SCell). Alternatively, one and the same radio access network node may alternatingly a PCell and an SCell, respectively.

Further, at least one radio access network node 110a, 110b may be configured to operate at least partly in an unlicensed frequency spectrum.

The communications system 100 further comprises at least one network device 200a, 200b, 200c. The at least one network device 200a, 200b, 200c may be provided in, or installed on, a radio access network node 110a, 110b or a wireless device 150. Functionality of the at least one network device 200a, 200b, 200c will be provided below.

Examples of wireless devices 150 include, but are not limited to, mobile stations, mobile phones, handsets, wireless local loop phones, user equipment (UE), smartphones, laptop computers, and tablet computers. Examples of radio access network nodes 110a, 110b include, but are not limited to, radio base stations, base transceiver stations, Node Bs, evolved node Bs, and access points. As the skilled person understands, the communications system 100 may comprise a plurality of radio access network nodes 110a, 110b, each providing network access to a plurality of wireless devices 150. The herein disclosed embodiments are not limited to any particular number of network devices 200a, 200b, 200c, radio access network nodes 110a, 110b, or wireless devices 150.

An LBT procedure can be defined as a mechanism by which a network device 200a, 200b, 200c applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in unlicensed frequency spectrum. Apart from regulatory requirements, carrier sensing via LBT is one way for fair sharing of the unlicensed frequency spectrum and hence can be used for fair and friendly operation in the unlicensed frequency spectrum.

As noted above, despite the above presented procedure, there is still a problem of how to handle data transmissions during LBT failure. An object of embodiments herein is therefore to provide efficient handling of scheduled data when the LBT fails.

In general terms, the layer L1 protocol can allow the transmission of the subframe or cancel the subframe depending on the LBT result. However, if LBT fails for the data in the current subframe but succeeds in the next possible subframe, the data cannot simply be re-used in the next subframe, e.g., due to the subframe index dependency of reference signals, etc. Hence, if LBT continues to fail and the subframes are getting discarded continuously but relying on the radio link control (RLC) automatic repeat request (ARQ), the data transmission would be clogged. One way to handle scheduled data when LBT fails is thus to discard the subframe, assuming that the scheduler at protocol layer L2 or higher needs to allocate resources in advance prior to the actual transmission over the air. This is illustrated in FIG. 6.

Figure 6:
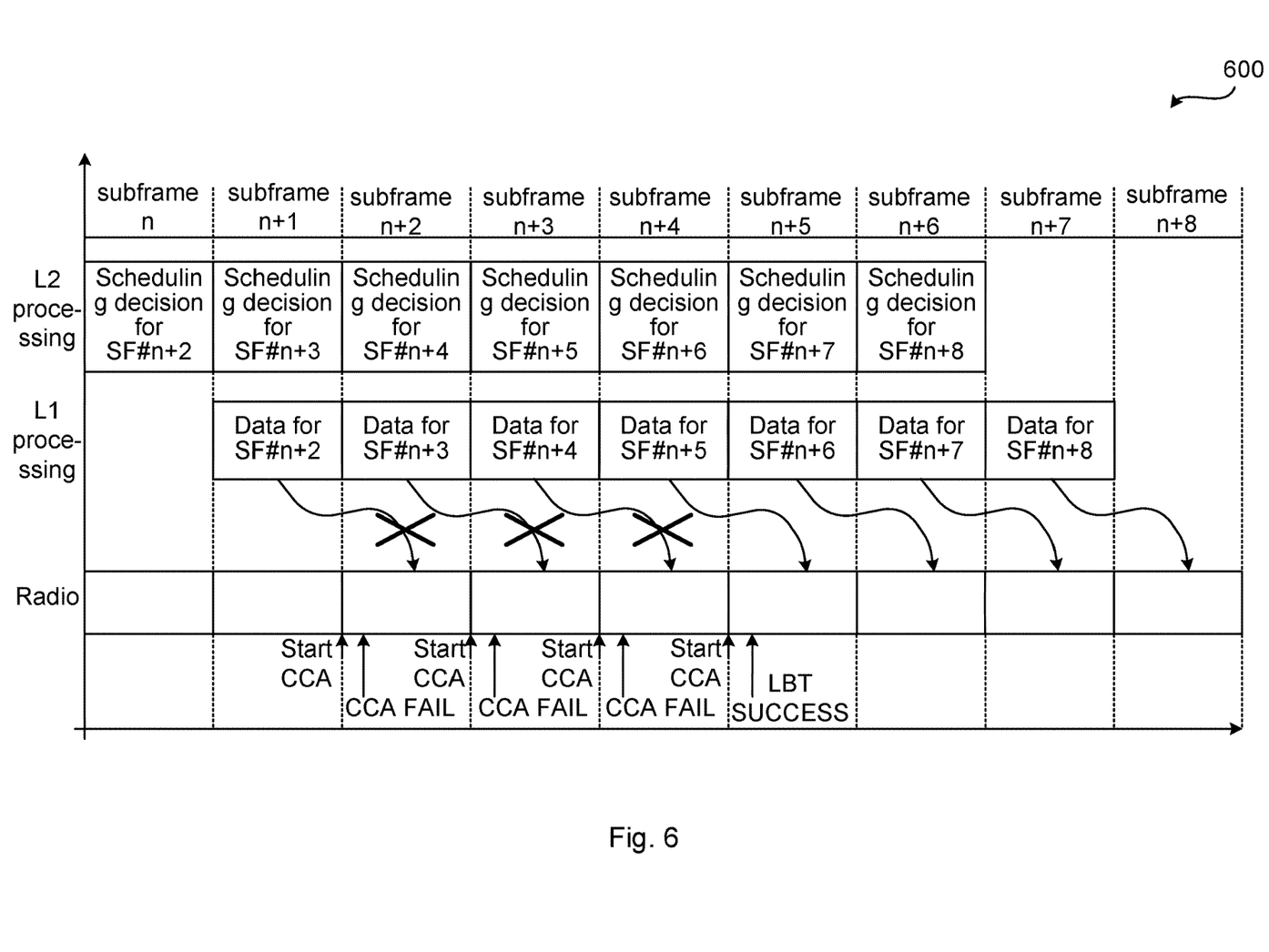
FIGS. 6 to 10 schematically illustrate scheduling processes in cases of LBT failure according to embodiments.

In FIG. 6, Scheduling decisions for subframes n+2, n+3, . . . , n+8 are taken at protocol layer L2 and the processing of the subframes at protocol layer L1 involves forwarding the subframes to the radio for transmission. FIG. 6 schematically illustrates a scheduling process 600 in cases of LBT failure where transmission of data in subframes (SF) n+2, n+3, and n+4 fails (as schematically indicated by arrows from "Data for SF # n+2", "Data for SF # n+3", and "Data for SF # n+4" to the radio being crossed) because of CCA failure; a CCA procedure for each subframe is started at "Start CCA" and the result is given as "CCA FAIL". Successful LBT is denoted by "LBT SUCCESS" after which data in the subframes can be successfully transmitted by the radio.

Figure 7:
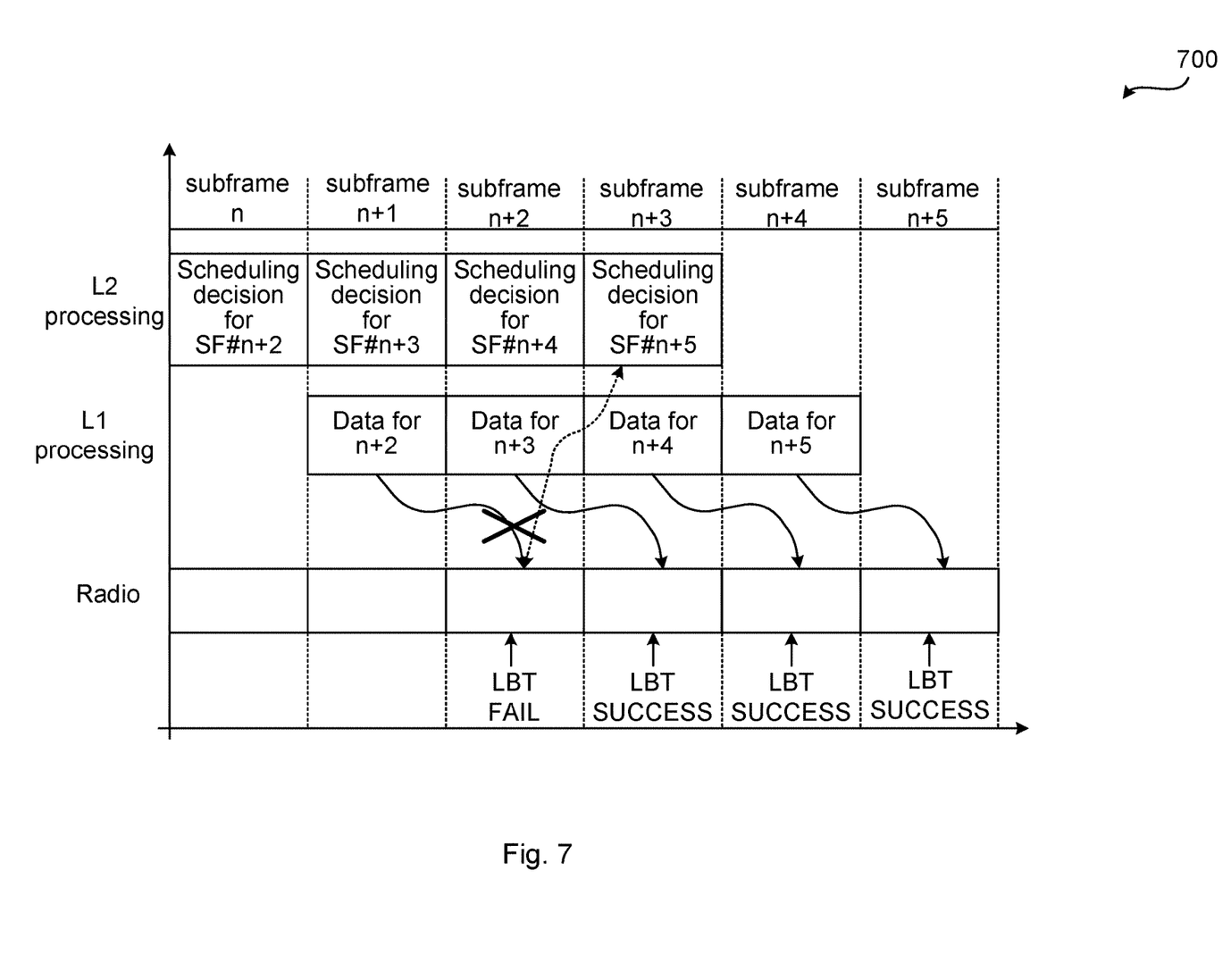

Another way to handle scheduled data when LBT fails is illustrated in FIG. 7. FIG. 7 schematically illustrates a scheduling process 700 in cases of LBT failure where transmission of data in subframes (SF) n+2 fails (as schematically indicated by arrow from "Data for SF # n+2" to the radio being crossed) because of LBT failure (as indicated by "LBT FAIL"). As for FIG. 6, the scheduler at protocol layer L2 schedules the data transmission and instructs the layer L1 protocol to construct the data for the transmission at a few milliseconds later. Different from FIG. 6, if LBT fails the transmission will not only be cancelled but also an LBT failure indication is sent to the scheduler at protocol layer L2 to reschedule the data (as indicated by the dotted arrow from "LBT FAIL" to "Scheduling decision for SF # n+5"), thus resulting in re-transmission of the data after few milliseconds. As seen in the example of FIG. 7, there is a delay to retransmit the data that is cancelled for transmission at subframe n+2 due to the LBT failure for that subframe; the data that is cancelled for transmission at subframe n+2 is successfully transmitted in the data for subframe n+5. The scheduling and transmission of data in-between, i.e. transmission at subframes n+3 and n+4, is not affected.

Some issues with the above disclosed ways to handle scheduled data when LBT fails have been identified. Firstly, the above disclosed ways cannot provide any QoS support. In more detail, it could be so that the data in subframe n+2 is the most important data, having highest scheduling priority. But because of the instantaneous high load at subframe n+2, which causes LBT failure, the transmission of the data in subframe n+2 is postponed to a time after the transmission of lower priority data. Further, there is no guarantee that the higher priority data will eventually be successfully transmitted. Secondly, the above disclosed ways result in inefficient resource allocation. In more detail the data has to be rescheduled whenever a LBT failure occurs and any processing at protocol layer L1 to composite the data has to be redone, which might be not needed since the radio condition most likely will be identical, or at least similar, after a few milliseconds (such as in LTE) or a few microseconds (such as in LTE evolution or 5G where the Transmission Time Interval (TTI) length is expected to be 62.5 microseconds) and the same allocation may be still be valid. To successfully transmit data using this approach thus requires processing power to be spent twice in both the scheduler and during processing at protocol layer L1. The effect grows with increasing system load and where LBT failure occurs more frequently. Further, rescheduling the data introduces a delay which could be large. The back and forth signaling sent from protocol layer L1 to the scheduler will also create unnecessary load. In summary, this approach thus systematically creates extra load to the scheduler and for processing at protocol layer L1 which, as will be disclosed below, is not needed.

The embodiments disclosed herein relate to scheduling subframes at protocol layer L1. In order to obtain scheduling subframes at protocol layer L1 there is provided a network device 200a, 200b, 200c, a method performed by the network device 200a, 200b, 200c, a computer program product comprising code, for example in the form of a computer program, that when run on a network device 200a, 200b, 200c, causes the network device 200a, 200b, 200c to perform the method.

Figure 4:
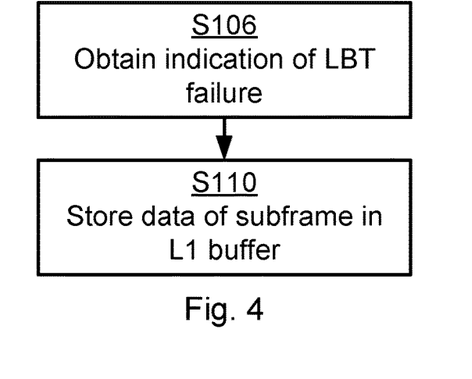
FIGS. 4 and 5 are flowcharts of methods according to embodiments.
Figure 5:
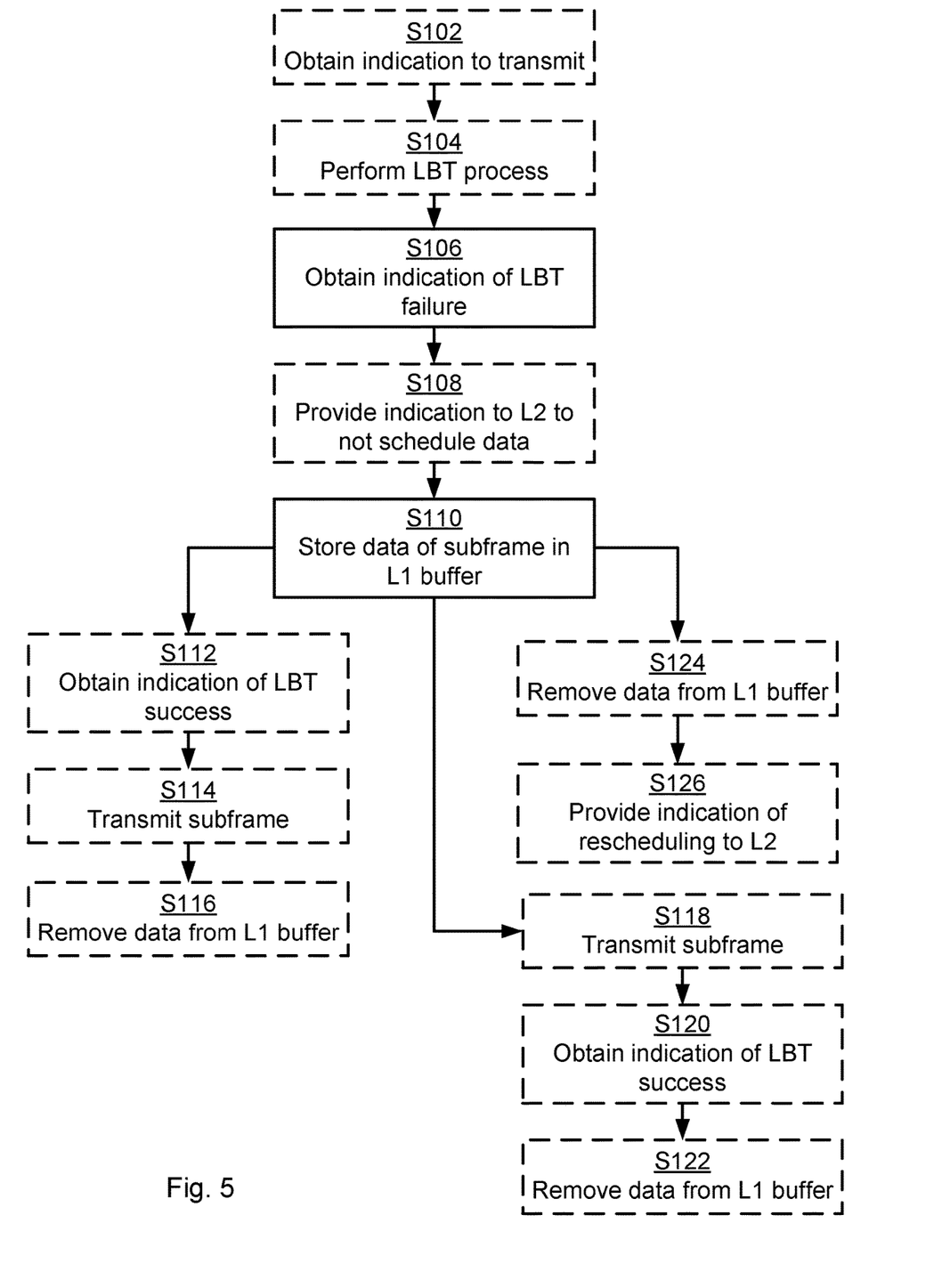

FIGS. 4 and 5 are flow chart illustrating embodiments of methods for scheduling subframes at protocol layer L1. The methods are performed by the network device 200a, 200b, 200c. The methods are advantageously provided as computer programs 320, see below.

Reference is now made to FIG. 4 illustrating a method for scheduling subframes at protocol layer L1 as performed by the network device 200a, 200b, 200c according to an embodiment.

The network device 200a, 200b, 200c is configured to, in a step S106, obtain, at protocol layer L1, an indication of an occurrence of LBT failure for transmission of a subframe in an unlicensed frequency spectrum.

The method is based on buffering, at protocol layer L1, data (for next possible transmission) in case LBT failure occurs in the unlicensed frequency spectrum. Hence, the network device 200a, 200b, 200c is configured to, in a step S110, store, in an L1 buffer (i.e., in a buffer at protocol layer L1), data of the subframe to be transmitted in the unlicensed frequency spectrum as a result thereof (i.e., in response to having obtained the indication of an occurrence of LBT failure as in step S106).

The L1 buffer thus acts as a priority buffer at protocol layer L1 so as to prioritize the data to be transmitted. Some scheduling functionality such as priority weight calculation for the data to be transmitted can thereby be introduced at protocol layer L1 as well. The data stored in the L1 buffer can be transmitted whenever LBT succeeds without involving a scheduler at a higher protocol layer. This enables processing resources to be saved as well as improving the latency.

Further, according to 3GPP TR 36.889 Version 13.0.0, asynchronous hybrid automatic repeat request (HARQ) is recommended for Licensed-Assisted Access (LAA) to unlicensed spectrum. This eases the implementation of the L1 buffering and delayed transmission of data until successful clear channel assessment.

Embodiments relating to further details of scheduling subframes at protocol layer L1 as performed by the network device 200a, 200b, 200c will now be disclosed.

Reference is now made to FIG. 5 illustrating methods for scheduling subframes at protocol layer L1 as performed by the network device 200a, 200b, 200c according to further embodiments.

There may be different events that may cause the LBT failure. For example, according to an embodiment the network device 200a, 200b, 200c is configured to, in a step S102, obtain an indication for the data of the subframe to be transmitted. The network device 200a, 200b, 200c is then configured to, in a step S104, perform an LBT process in the unlicensed frequency spectrum. It is assumed that this LBT process results in the LBT failure. Generally, LBT fails when the channel on which the data is to be transmitted on is occupied at the time the data is to be transmitted on the channel. That is, LBT failure can be defined by the channel for the data transmission being occupied.

There may be different ways for the network device 200a, 200b, 200c to perform the LBT process. For example, according some aspects, LBT involves performing one or more clear channel assessments (CCA). That is, according to an embodiment, performing the LBT process involves the network device 200a, 200b, 200c to perform at least one CCA.

There may be different reasons for the network device 200a, 200b, 200c to perform the LBT process. According to an embodiment the LBT process is performed during a licensed assisted access (LAA) process to access the unlicensed frequency spectrum. According to another embodiment the LBT process is performed during a stand-alone process to access the unlicensed frequency spectrum.

There may be different ways for the network device 200a, 200b, 200c to obtain the indication for the data of the subframe to be transmitted. According to an embodiment the indication for the data of the subframe to be transmitted is obtained from higher protocol layer, such as from protocol layer L2, as a proposed scheduling of the data.

There may be different ways for the network device 200a, 200b, 200c to act once it has obtained the indication of an occurrence of LBT failure as in step S106. According to some aspects the network device 200a, 200b, 200c from protocol layer L1 sends information to protocol layer L2 to not schedule data. Hence, according to an embodiment the network device 200a, 200b, 200c is configured to, in a step S108, provide an indication to protocol layer L2 not to schedule data in response to the network device 200a, 200b, 200c having obtained the indication of the LBT failure (as in step S106).

There may be different ways for the network device 200a, 200b, 200c to act once it has stored the data, as in step S110. According to some aspects the network device 200a, 200b, 200c transmits stored data whenever LBT succeeds. Hence, according to an embodiment the network device 200a, 200b, 200c is configured to, in a step S112, obtain, at the protocol layer L1, an indication of LBT success. The network device 200a, 200b, 200c is then configured to, in a step S114, transmit the subframe in the unlicensed frequency spectrum. The data of the thus transmitted subframe can then be removed. The network device 200a, 200b, 200c is therefore configured to, in a step S116, remove the data of the subframe from the L1 buffer, thereby at least partly emptying the L1 buffer. According to another embodiment the network device 200a, 200b, 200c is configured to, in a step S118, transmit the subframe in the unlicensed frequency spectrum; and, in a step S120, obtain, at the protocol layer L1, an indication of LBT success in response to having transmitted the subframe in the unlicensed frequency spectrum. Hence, according to this embodiment the subframe comprising data is transmitted without first performing an LBT process. The data of the thus transmitted subframe can then be removed. The network device 200a, 200b, 200c is therefore configured to, in a step S122, remove the data of the subframe from the L1 buffer, thereby at least partly emptying the L1 buffer. The transmitted subframe can comprise scheduling assignments valid for multiple transmission time intervals (TTIs).

There may be different ways to determine the buffer size of the L1 buffer. According to an embodiment the L1 buffer has a buffer size that is dependent on a maximum pre-scheduling delay.

Data from more than one subframe can simultaneously be stored in the L1 buffer. That is, according to an embodiment the L1 buffer is capable of simultaneously storing data from more than one subframe.

There may be different ways to determine how to handle data stored in the L1 buffer, for example, which data to discard in case the L1 buffer is full, when to discard data, and in which order to transmit data once LBT succeeds. Different embodiments relating thereto will now be disclosed in turn.

The L1 buffer can have a prioritization mechanism that is configured to determine which buffered data shall be transmitted first in order to fulfill QoS requirements. According to some aspects, data scheduled for the earliest subframe is prioritized. Hence, according to an embodiment the L1 buffer is emptied such that data from earliest scheduled subframe of all subframes stored in the L1 buffer is emptied first from the L1 buffer. According to some aspects, data with largest scheduling weight is prioritized and selected for transmission. Hence, according to an embodiment the L1 buffer is emptied such that data from subframe with highest priority of all subframes stored in the L1 buffer is emptied first from the L1 buffer. According to some aspects, a scheduling weight is calculated for each subframe. Hence, according to an embodiment all subframes stored in the L1 buffer are assigned priorities according respective scheduling weights.

According to some aspects, data is removed from the L1 buffer if the data has been stored too long. A need for rescheduling of this removed data can then be indicated. Hence, according to an embodiment the network device 200a, 200b, 200c is configured to, in a step S124, remove the data of the subframe stored in the L1 buffer once the data has been stored longer than a threshold time value. The network device 200a, 200b, 200c is then configured to, in a step S126, provide an indication of rescheduling of the data of the subframe to protocol layer L2 (e.g., to a media access control (MAC) scheduler). There may be different ways to determine the threshold time value. For example, the threshold time value can be dependent on at least one of maximum channel occupancy time in the unlicensed frequency spectrum, fading channel condition for the unlicensed frequency spectrum, memory capacity at the network device and/or at a network device intended to receive the subframe, processing time at the network device and/or at the network device intended to receive the subframe. Further, the threshold time value can be dependent on a time deadline for transmitting a packet on a protocol layer higher than L1.

Figure 8:
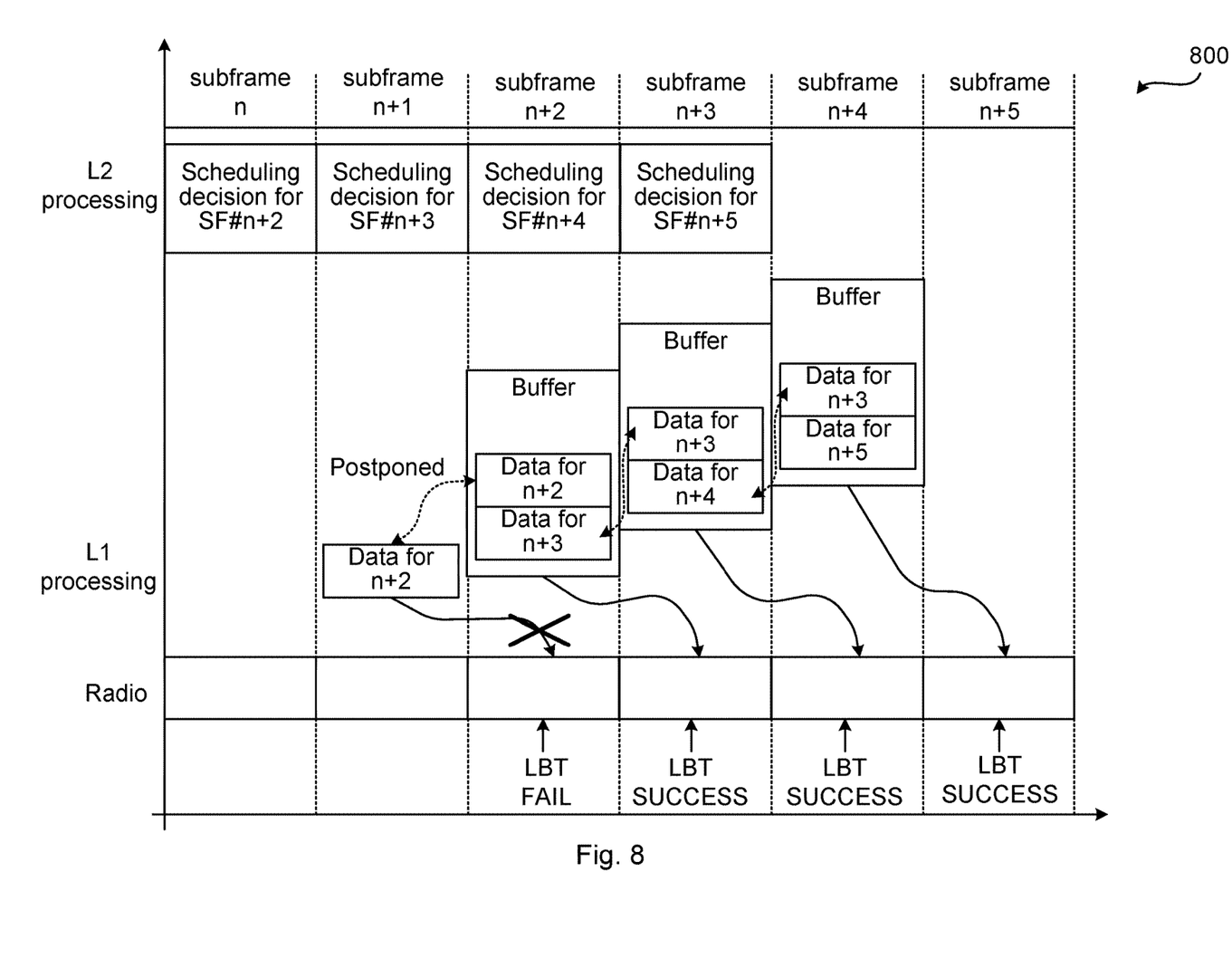
Figure 9:
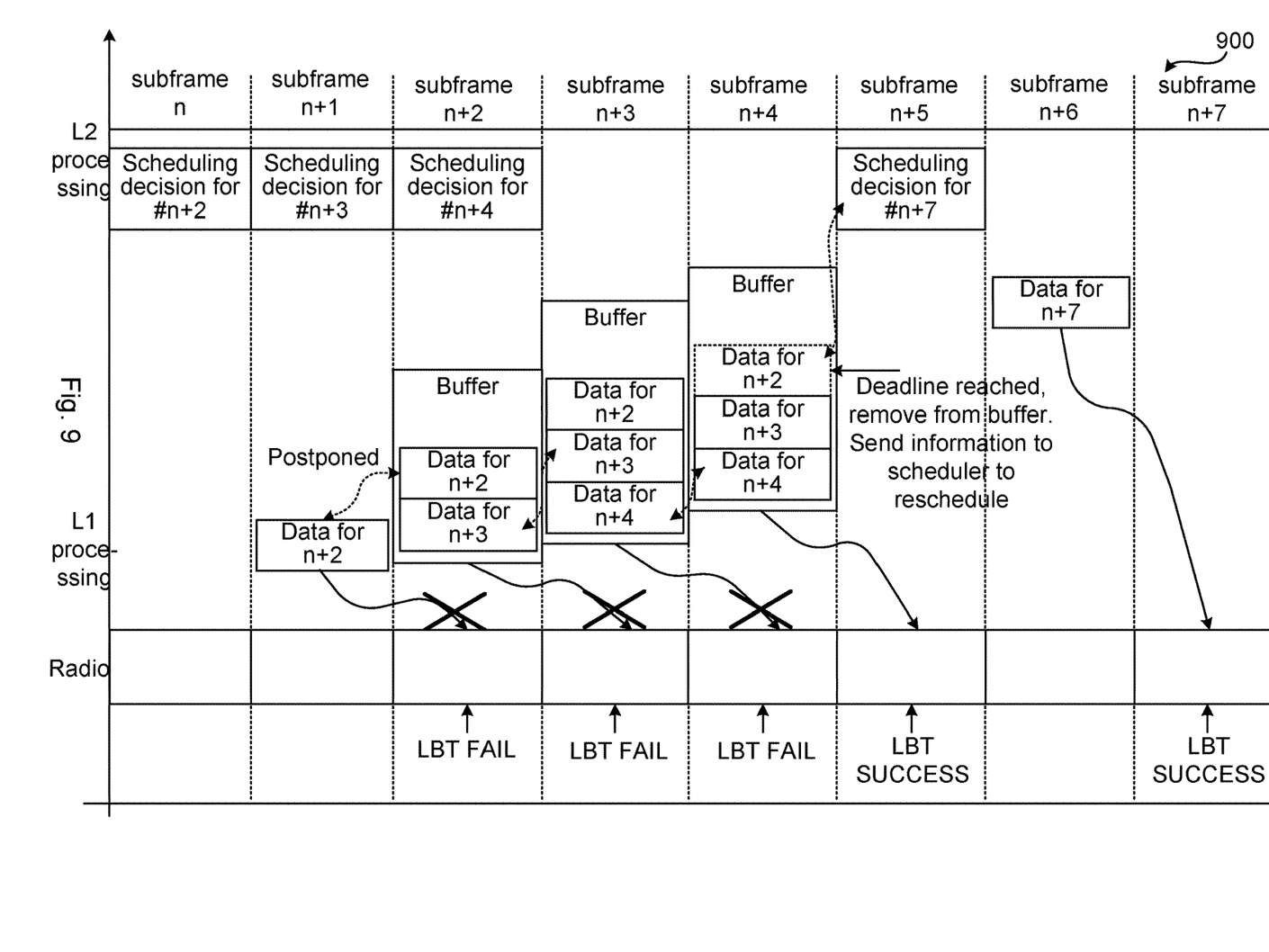

A first particular embodiment for scheduling subframes at protocol layer L1 as performed by the network device 200a, 200b, 200c will now be disclosed with reference to FIGS. 8 and 9.

FIGS. 8 and 9 schematically illustrate scheduling processes 80o, 900 in cases of LBT failure where transmission of data (as schematically indicated by arrows from the L1 processing to the radio being crossed) because of LBT failure (as indicated by "LBT FAIL").

If LBT fails for a subframe (e.g., subframe n+2 in the illustrative example of FIG. 8), the data is stored in an L1 buffer to be processed for the next subframe. If there is a scheduling decision and data is also prepared for the next subframe (i.e., subframe n+3), the L1 buffer stores data from both the previous subframe (i.e., subframe n+2) and the newly scheduled data for the current subframe (i.e., subframe n+3), as schematically indicated by the buffer at subframe n+2 storing "Data for n+2" as well as "Data for n+3".

As disclosed above, with data from more than one subframe stored in the L1 buffer, different mechanism can be applied to select which data to transmit when LBT is successful (as indicated by "LBT SUCCESS").

As one non-limiting example, the data for transmission is selected based on the "first in first out" principle, i.e., the data scheduled for the earliest subframe is prioritized, as schematically indicated by the buffer at subframe n+3 storing "Data for n+3" as well as "Data for n+4" whereas "Data for n+2" now has been transmitted (as a result of successful LBT).

As another non-limiting example, flexibility is considered when selecting the data for transmission, for example based on a scheduling weight that is calculated for the data in each subframe. The scheduling weight can be based on the QoS Class Identifier (QCI) of the data, and thus the data with largest scheduling weight can be prioritized and selected for transmission.

In one example, the scheduling weight is the average weight of each scheduled data for the subframe. In another example, the scheduling weight is the highest weight among all scheduled data for the subframe. In another example, when multi-TTI or cross-TTI scheduling is supported, it is possible to send the scheduling assignments in one subframe which are valid for multiple TTIs. Further, if the physical resource block (PRB) allocations of the scheduling decisions from multiple TTIs are not conflicting and overlapped, it is also possible at protocol layer L1 to transmit the scheduling assignments and scheduled data from multiple TTIs together at once, which are valid for one subframe, whenever LBT succeeds. If the L1 buffer stores data that scheduled by protocol layer L2 for several TTIs, the buffered data can, at protocol layer L1, be assigned to be transmitted in one TTI (or resource block (RB) or bandwidth resource) than that scheduled at protocol layer L2.

In the illustrative example of FIG. 8 this is schematically indicated by the buffer at subframe n+4 storing "Data for n+3" as well as "Data for n+5" whereas "Data for n+4", because of having higher priority than "Data for n+3", now has been transmitted (as a result of successful LBT).

As disclosed above, if the time for data stored in the L1 buffer is longer than a threshold, the data can be removed from the L1 buffer and indicated to a higher layer protocol, such as a protocol layer L2, for rescheduling. When the higher layer protocol deadline is reached, the data is removed from the L1 buffer but no rescheduling is needed. In this respect, reaching the higher layer protocol deadline is not the only criteria to remove data from the L1 buffer. Other criteria can be memory size of the L1 buffer, or that the communications channel varies so much that the encoded data is not valid anymore. Higher layer retransmissions will be generated if needed.

In the illustrative example of FIG. 9 this is schematically illustrated by the indication "Deadline reached, remove from buffer. Send information to scheduler to reschedule" at "Data for n+2" in subframe n+2. A new scheduling decision for n+7 is thus taken by the L2 processing at subframe n+7, where the scheduling decision concerns re-transmission of the data for n+2, which thus is identical to "Data for n+7".

Figure 10:
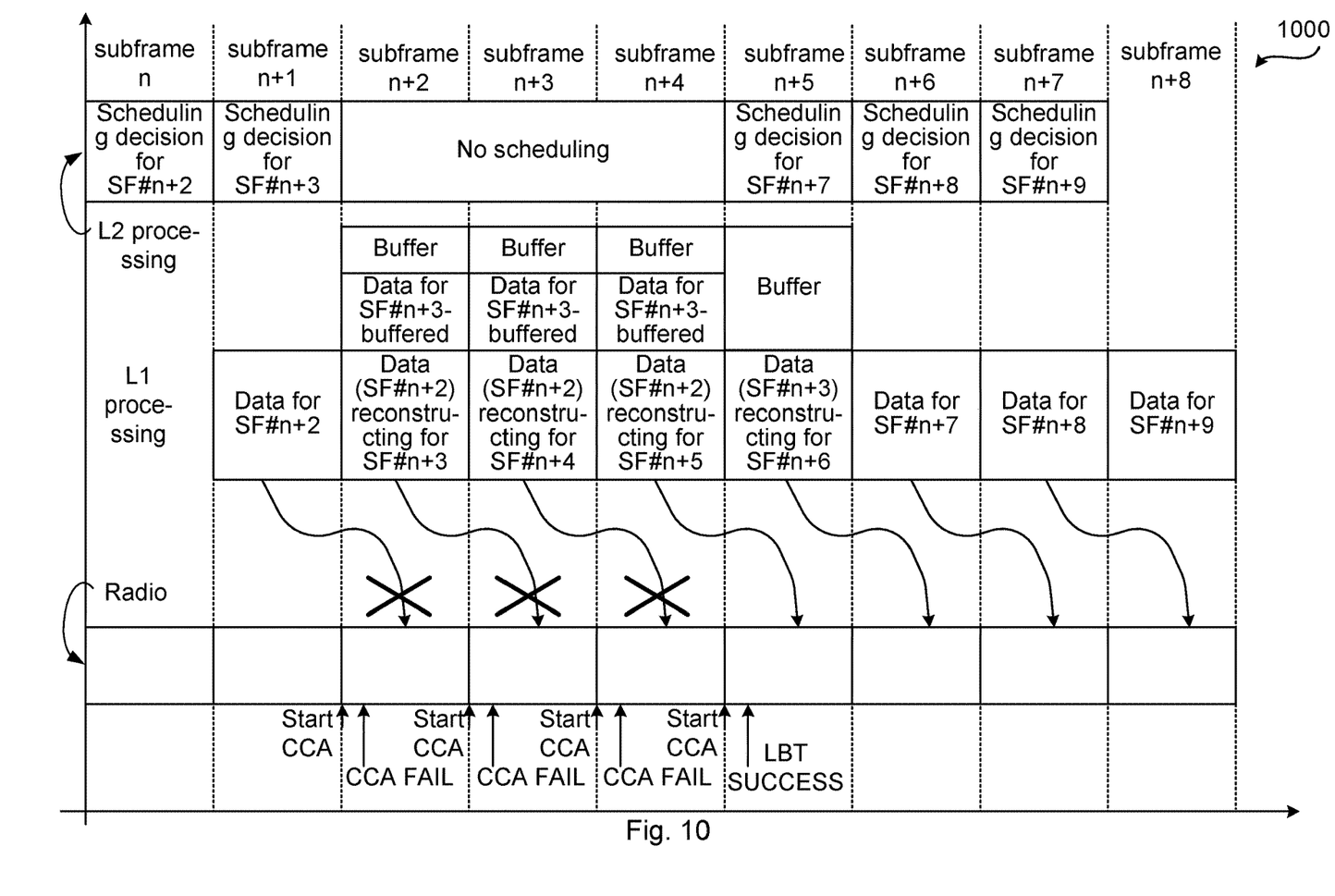

A second particular embodiment for scheduling subframes at protocol layer L1 as performed by the network device 200a, 200b, 200c will now be disclosed with reference to FIG. 10.

FIG. 10 schematically illustrates a scheduling process 1000 in cases of LBT failure where transmission of data (as schematically indicated by arrows from the L1 processing to the radio being crossed) because of CCA failure (as indicated by "CCA FAIL").

In comparison to the first particular embodiment the second particular embodiment provides lower memory requirements for the L1 buffer and also provides improved QoS requirement.

In the embodiment of FIG. 10 the L1 buffer is limited to a maximum pre-scheduling delay (where data of only 2 subframes for the considered example can be stored in the L1 buffer) without penalizing the QoS. If LBT fails for a subframe (subframe n+2 in the non-limiting example of FIG. 10), the data is stored in the L1 buffer to be re-processed and/or prioritized for the next subframe (subframe n+3). If there is a scheduling decision and data is also prepared for the next subframe (i.e. for subframe n+3), the L1 buffer stores data from the previous subframe (i.e. subframe n+2) and the newly scheduled data for the current subframe (i.e., for subframe n+3). However, no new scheduling decisions will be made until the CCA/LBT succeeds; and meanwhile the scheduling would, or at least could, be re-directed to another radio access network node(s) (if the network device is part of a radio access network node).

As disclosed above, with data from more than one subframe stored in the L1 buffer, different mechanism can be applied to select which data to transmit.

As disclosed above, if the time for data stored in the L1 buffer is longer than a threshold, the data can be removed from the L1 buffer and indicated to a higher layer protocol, such as a protocol layer L2, for rescheduling. When the higher layer protocol deadline is reached, the data is removed from the L1 buffer but no rescheduling is needed. Higher layer retransmissions will be generated if needed.

Figure 2A:
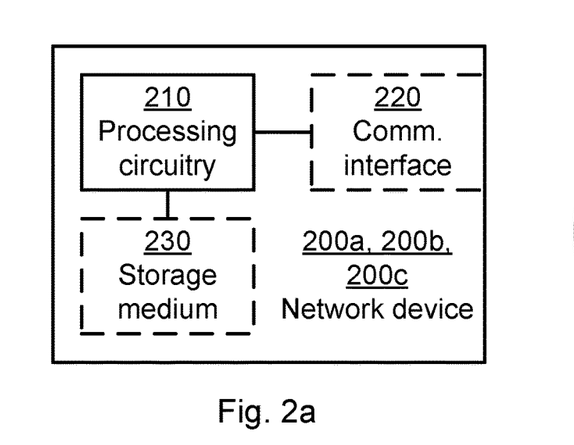
FIG. 2*a* is a schematic diagram showing functional units of a network device according to an embodiment.

FIG. 2a schematically illustrates, in terms of a number of functional units, the components of a network device 200a, 200b, 200c according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the network device 200a, 200b, 200c to perform a set of operations, or steps, S102-S126 as disclosed above. For example, the storage medium 230 may store the set of operations, and the processing circuitry 210 may be configured to retrieve the set of operations from the storage medium 230 to cause the network device 200a, 200b, 200c to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network device 200a, 200b, 200c may further comprise a communications interface 220 for communications with a radio access network node 110a, 110b or a wireless device 150. As such the communications interface 220 may comprise one or more transmitters and receivers, comprising analogue and digital components. The processing circuitry 210 controls the general operation of the network device 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the network device 200a, 200b, 200c are omitted in order not to obscure the concepts presented herein.

Figure 2B:
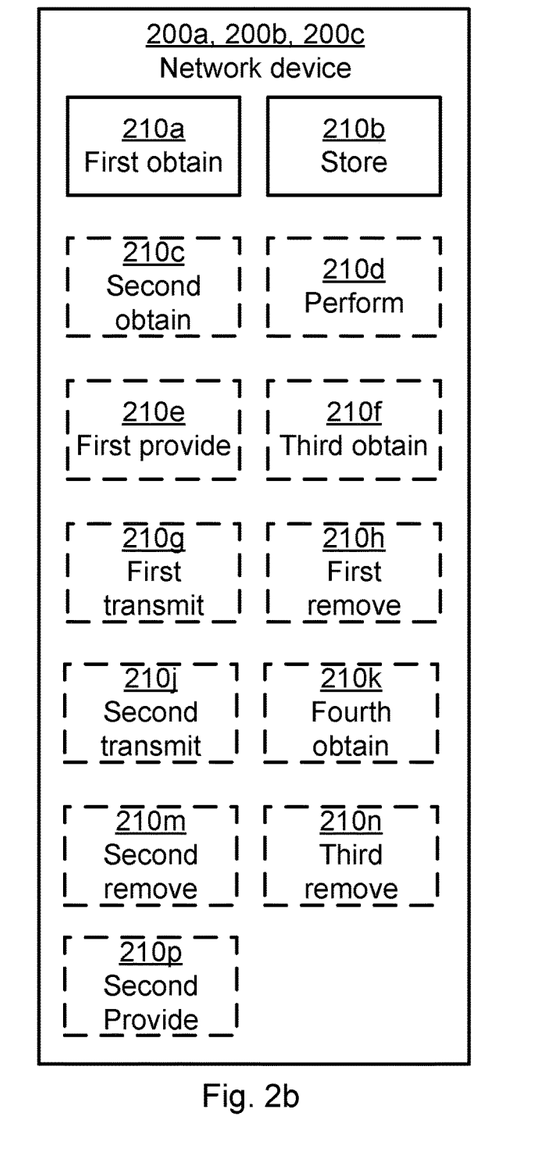
FIG. 2*b* is a schematic diagram showing functional modules of a network device according to an embodiment.

FIG. 2b schematically illustrates, in terms of a number of functional modules, the components of a network device 200a, 200b, 200c according to an embodiment. The network device 200a, 200b, 200c of FIG. 2b comprises a number of functional modules; a first obtain module 210a configured to perform step S106, and a store module 210b configured to perform step S110. The network device 200a, 200b, 200c of FIG. 2b may further comprises a number of optional functional modules, such as any of a second obtain module 210c configured to perform step S102, a perform module 210d configured to perform step S104, a first provide module 210e configured to perform step S108, a third obtain module 210f configured to perform step S112, a first transmit module 210g configured to perform step S114, a first remove module 210h configured to perform step S116, a second transmit module 210j configured to perform step S118, a fourth obtain module 210k configured to perform step S120, a second remove module 210m configured to perform step S122, a third remove module 210n configured to perform step S124, and a second provide module 210p configured to perform step S126. In general terms, each functional module 210a-210k may in one embodiment be implemented only in hardware or and in another embodiment with the help of software, i.e., the latter embodiment having computer program instructions stored on the storage medium 230 which when run on the processing circuitry makes the network device 200a, 200b, 200c perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210k may be implemented by the processing circuitry 210, possibly in cooperation with functional units 220 and/or 230. The processing circuitry 210 may thus be configured to from the storage medium 230 fetch instructions as provided by a functional module 210a-210k and to execute these instructions, thereby performing any steps as will be disclosed hereinafter.

The network device 200a, 200b, 200c may be provided as a standalone device or as a part of at least one further device.

For example, the network device 200a, 200b is, according to some aspects, part of a radio access network node 110a, 110b. Hence, according to an embodiment there is provided a radio access network node 110a, 110b comprising a network device 200a, 200b as herein disclosed. The radio access network node is, according to some aspects, configured to serve a secondary cell (SCell) and hence the radio access network node can be configured to, in the unlicensed frequency spectrum, transmit a frame in the SCell.

For example, the network device 200a, 200b is, according to some aspects, part of a wireless device 150. Hence, according to an embodiment there is provided a wireless device 150 comprising a network device 200c as herein disclosed.

It is thus understood that the herein disclosed embodiments can apply both in downlink (i.e., transmission from a radio access network node 110a, 110b to a wireless device 150) where the herein disclosed embodiments are performed by the radio access network node 110a, 110b and uplink (i.e., transmission to a radio access network node 110a, 110b from a wireless device 150) where the herein disclosed embodiments are performed by the wireless device 150.

Figure 3:
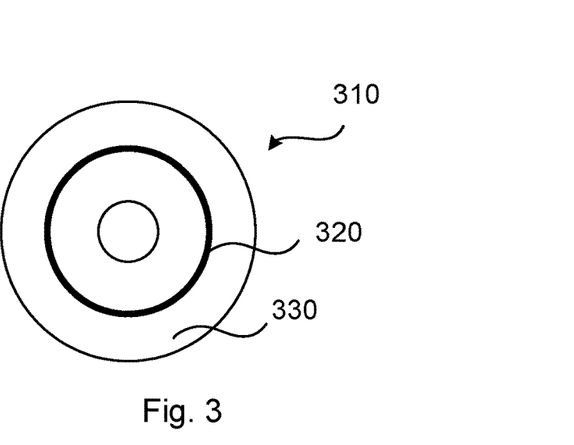
FIG. 3 shows one example of a computer program product comprising computer readable storage medium according to an embodiment.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, the herein disclosed embodiments are applicable for both frequency division duplex (FDD) and time division duplex (TDD) LAA. Further, the herein disclosed embodiments are applicable for single carrier as well as multi-carrier scenarios. Further, it is to be understood that the herein disclosed embodiments readily apply to different variations of LTE operating in unlicensed frequency spectrum, such as LTE-U and standalone LTE-U.

The invention claimed is:

1. A method for scheduling subframes at protocol layer L1, the method being performed by a network device, the method comprising:
   obtaining, at the protocol layer L1, an indication of an occurrence of Listen Before Talk, LBT, failure for transmission of a subframe in an unlicensed frequency spectrum;
   storing, in an L1 buffer, data of the subframe to be transmitted in the unlicensed frequency spectrum as a result thereof, wherein the L1 buffer is emptied such that data from subframe with highest priority of all subframes stored in the L1 buffer is emptied first from the L1 buffer.

2. The method according to claim 1, further comprising:
   obtaining an indication for the data of the subframe to be transmitted; and
   performing an LBT process in the unlicensed frequency spectrum as a result thereof, and wherein the LBT process results in said LBT failure.

3. The method according to claim 2, wherein the indication for the data of the subframe to be transmitted is obtained from protocol layer L2 as a proposed scheduling of the data.

4. The method according to claim 2, wherein performing the LBT process involves performing at least one clear channel assessment, CCA.

5. The method according to claim 2, wherein the LBT process is performed during a licensed assisted access, LAA, process to access the unlicensed frequency spectrum.

6. The method according to claim 2, wherein the LBT process is performed during a stand-alone process to access the unlicensed frequency spectrum.

7. The method according to claim 1, further comprising:
   providing an indication to protocol layer L2 not to schedule data in response to having obtained the indication of the LBT failure.

8. The method according to claim 1, further comprising:
   obtaining, at the protocol layer L1, an indication of LBT success;
   transmitting the subframe in the unlicensed frequency spectrum in response to having obtained the indication of the LBT success; and
   removing the data of the subframe from the L1 buffer, thereby at least partly emptying the L1 buffer.

9. The method according to claim 1, further comprising:
   transmitting the subframe in the unlicensed frequency spectrum; obtaining, at the protocol layer L1, an indication of LBT success in response to having transmitted the subframe in the unlicensed frequency spectrum; and
   removing the data of the subframe from the L1 buffer, thereby at least partly emptying the L1 buffer.

10. The method according to claim 8, wherein the transmitted subframe comprises scheduling assignments valid for multiple transmission time intervals, TTIs.

11. The method according to claim 1, wherein all subframes stored in the L1 buffer are assigned priorities according to respective scheduling weights.

12. The method according to claim 1, further comprising:
   removing the data of the subframe stored in the L1 buffer once the data has been stored longer than a threshold time value; and
   providing an indication of rescheduling of the data of the subframe to protocol layer L2.

13. A network device for scheduling subframes at protocol layer L1, the network device comprising:
   processing circuitry; and
   a computer readable memory storing instructions that, when executed by the processing circuitry, causes the network device to:
   obtain, at the protocol layer L1, an indication of an occurrence of Listen Before Talk, LBT, failure for transmission of a subframe in an unlicensed frequency spectrum;
   store, in an L1 buffer, data of the subframe to be transmitted in the unlicensed frequency spectrum as a result thereof, and
   empty, the L1 buffer such that data from subframe with highest priority of all subframes stored in the L1 buffer is emptied first from the L1 buffer.

14. A radio access network node comprising a network device according to claim 13.

15. A wireless device comprising a network device according to claim 13.

16. A non-transitory computer storage medium storing a computer program for scheduling subframes at protocol layer L1, the computer program comprising computer code which, when run on processing circuitry of a network device, causes the network device to:
   obtain, at the protocol layer L1, an indication of an occurrence of Listen Before Talk, LBT, failure for transmission of a subframe in an unlicensed frequency spectrum;
   store, in an L1 buffer, data of the subframe to be transmitted in the unlicensed frequency spectrum as a result thereof, and
   empty, the L1 buffer such that data from subframe with highest priority of all subframes stored in the L1 buffer is emptied first from the L1 buffer.

* * * * *